United States Patent
Lin et al.

(10) Patent No.: US 10,282,209 B2
(45) Date of Patent: May 7, 2019

(54) SPECULATIVE LOOKAHEAD PROCESSING DEVICE AND METHOD

(71) Applicant: National Chung Cheng University, Chia-Yi (TW)

(72) Inventors: Tay-Jyi Lin, Chiayi County (TW); Jinn-Shyan Wang, Chia-yi (TW); Ting-Yu Shyu, New Taipei (TW); Yi-Hsuan Ting, Taichung (TW)

(73) Assignee: NATIONAL CHUNG CHENG UNIVERSITY, Chia-Yi (TW)

( * ) Notice: Subject to any disclaimer, the term of this patent is extended or adjusted under 35 U.S.C. 154(b) by 586 days.

(21) Appl. No.: 14/486,311

(22) Filed: Sep. 15, 2014

(65) Prior Publication Data
US 2015/0277927 A1 Oct. 1, 2015

(30) Foreign Application Priority Data
Apr. 1, 2014 (TW) .............................. 103112118 A (51) Int. Cl.
*G06F 9/30* (2018.01)
*G06F 9/38* (2018.01)

(52) U.S. Cl.
CPC .......... *G06F 9/3861* (2013.01); *G06F 9/3842* (2013.01); *G06F 9/3869* (2013.01)

(58) Field of Classification Search
None
See application file for complete search history.

(56) References Cited

U.S. PATENT DOCUMENTS

| | | | |
|---|---|---|---|
| 7,096,137 B2 * | 8/2006 | Shipton | B41J 2/04505 327/141 |
| 7,162,661 B2 * | 1/2007 | Mudge | G06F 1/3203 714/10 |
| 7,310,755 B2 | 12/2007 | Mudge et al. | |
| 7,320,091 B2 | 1/2008 | Blaauw et al. | |
| 7,337,356 B2 | 2/2008 | Mudge et al. | |

* cited by examiner

*Primary Examiner* — Corey S Faherty
(74) *Attorney, Agent, or Firm* — Muncy, Geissler, Olds & Lowe, P.C.

(57) ABSTRACT

The present invention discloses a speculative lookahead processing device and method to enhance the statistical performance of datapaths. The method comprises steps: entering an input signal to at least two datapath units in a round-robin way; outputting the correct value at the Nth cycle, and acquiring the speculation value at the Mth cycle beforehand to start the succeeding computation, wherein M and N are natural numbers and M is smaller than N; comparing the speculation value with the correct value at the Nth cycle to determine whether the speculation is successful; if successful, excluding extra activities; if not successful, deleting the succeeding computation undertaken beforehand and restarting the succeeding computation with the correct value.

4 Claims, 14 Drawing Sheets

Fig. 1

(Prior Art)

(Prior Art)

(Prior Art)

Fig. 7

(Prior Art)

SPECULATIVE LOOKAHEAD PROCESSING DEVICE AND METHOD

This application claims priority for Taiwan patent application no. 103112118 filed at Apr. 1, 2014, the content of which is incorporated by reference in its entirely.

BACKGROUND OF THE INVENTION

Field of the Invention

The present invention relates to a processing technology, particularly to a speculative lookahead processing device and method.

Description of the Related Art

Figure 1:
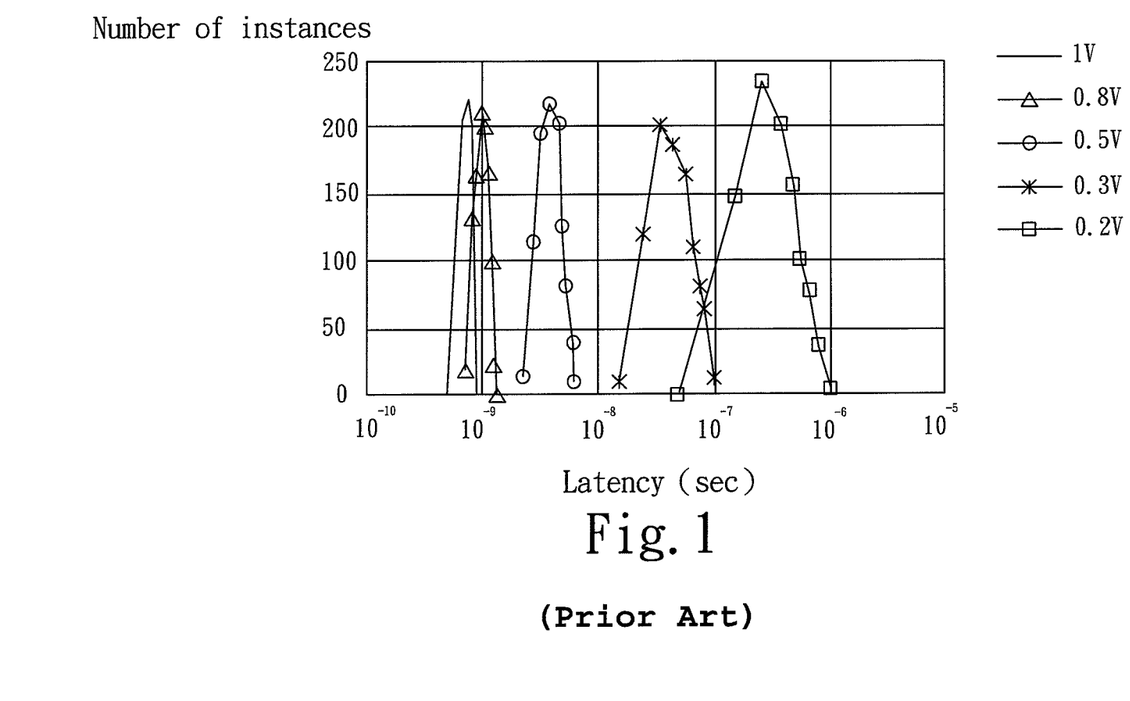
FIG. 1 shows the latency distributions of IC operating at different voltages in a conventional technology.
Figure 2:
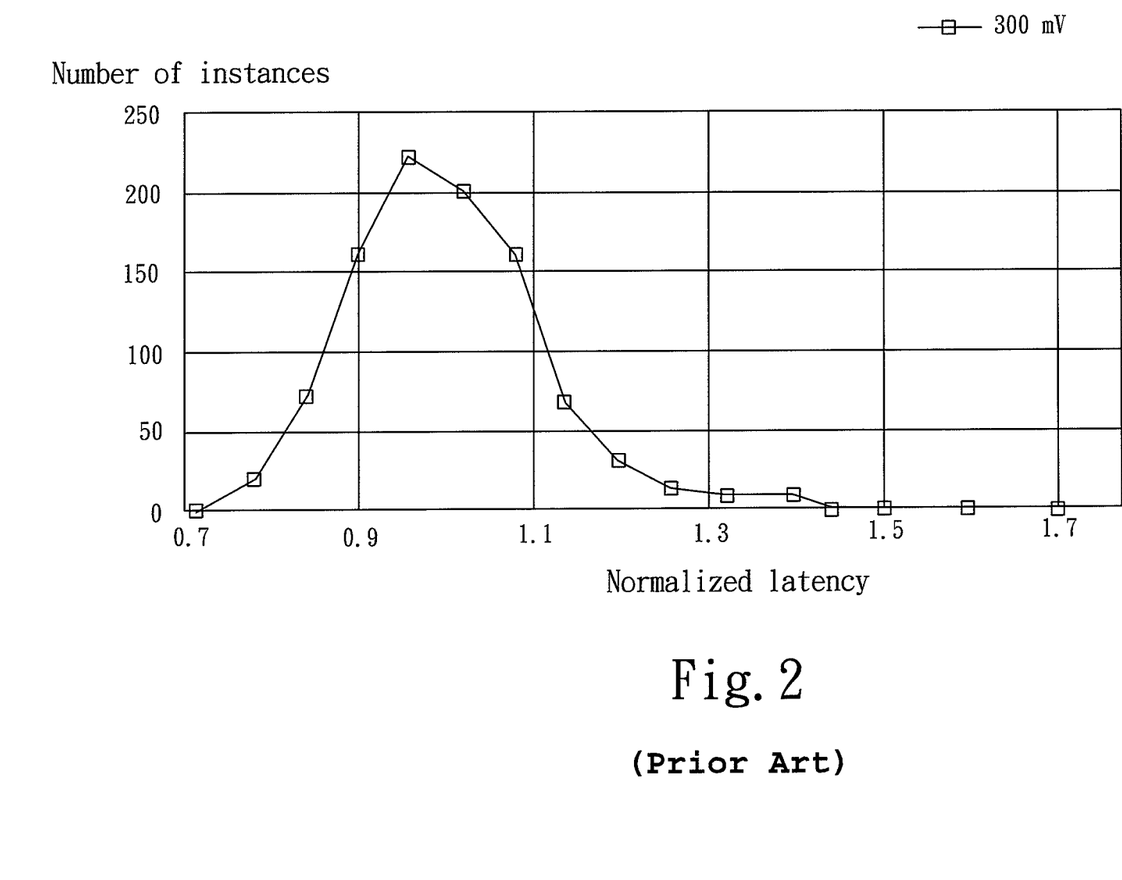
FIG. 2 shows the normalized latencies of IC operating at 300 mV in a conventional technology.
Figure 3:
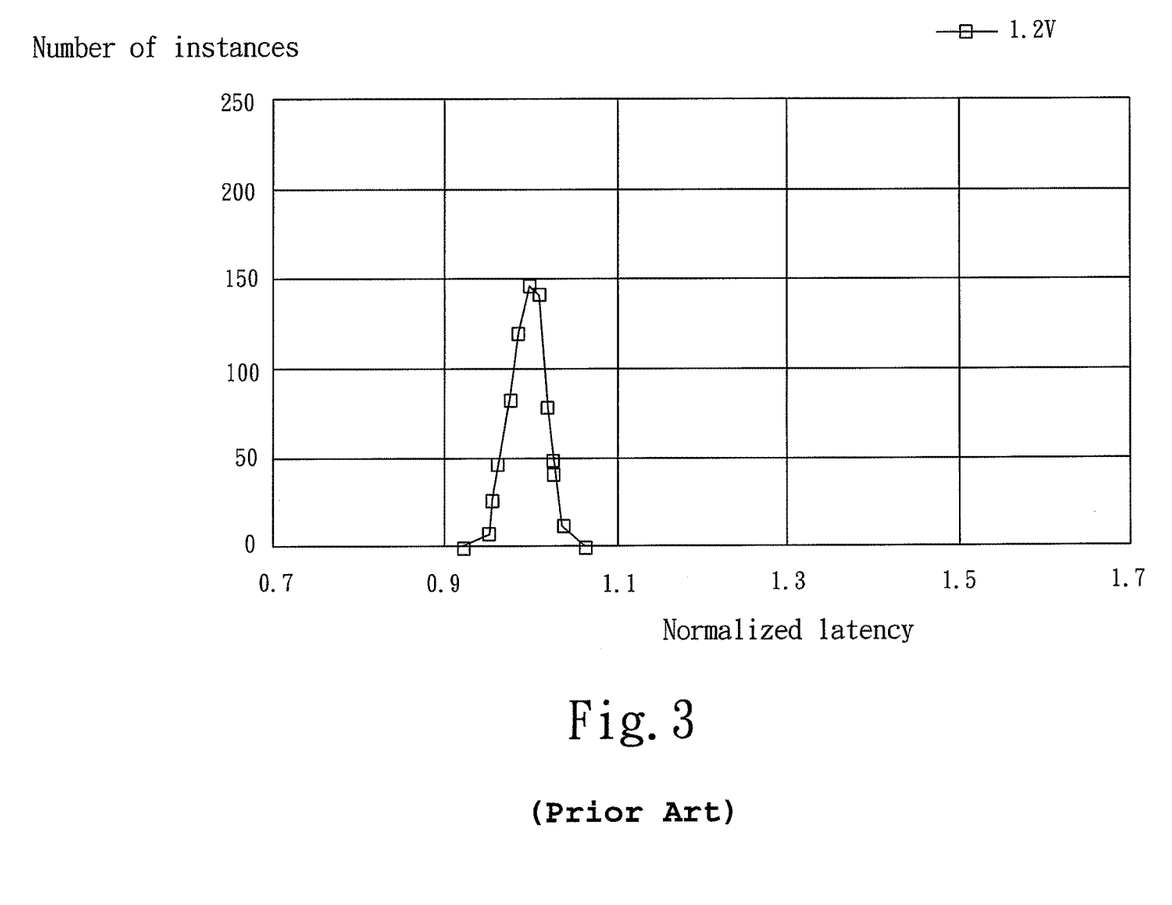
FIG. 3 shows the normalized latencies of IC operating at 1.2V in a conventional technology.
Figure 4:
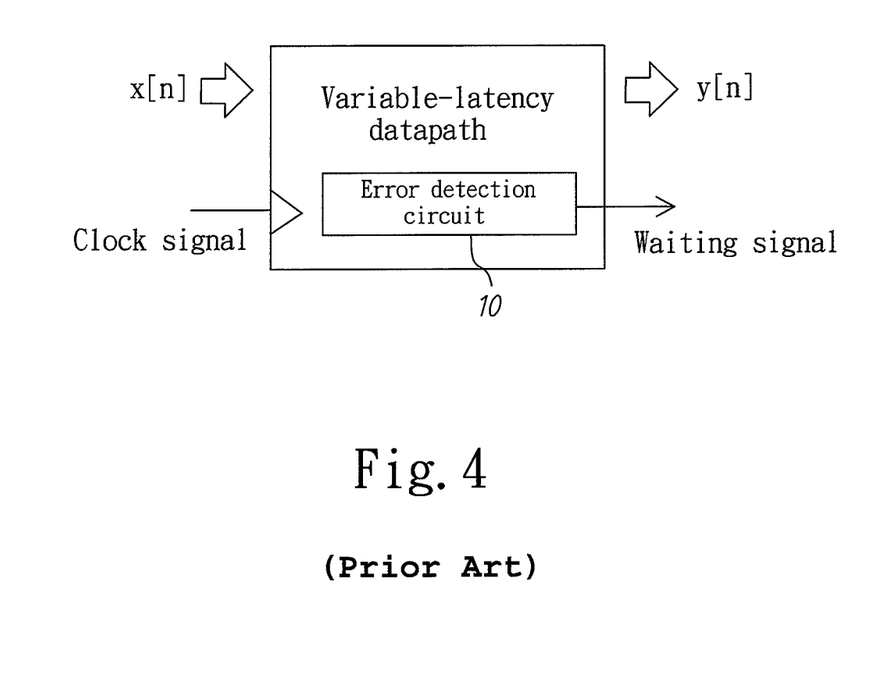
FIG. 4 is a diagram schematically showing a variable-latency datapath in a conventional technology.

The IC fabrication technology is advancing persistently, and the transistors on a chip are growing smaller and faster. Thus, more transistors operating faster are packed into a smaller chip, and the performance of IC is enhanced, which favors the applications to high speed computation, consumer electronics, automobile electronics, medicine and healthcare. However, the IC having fast transistors densely packed thereinside would result in problems of power consumption and heat dissipation, which have been the bottlenecks in IC design. The power consumption of a chip is proportional to the square of the voltage supplied to the chip. Decreasing the operating voltage of a chip is one of the most effective methods to save power. In order to increase the working time of battery-powered devices, the industry tends to design and fabricate IC operating at ultralow voltage. Thus, many ultralow voltage IC-related technologies have been developed. In the advanced process technology, especially in the sub-40 nanometer IC design, variation of transistors is very serious, wherein different trace width and length resulting from optical diffraction and chemical etching causes the circuits to operate at different speeds, especially in the ultralow voltage IC. The abovementioned transistor variation is likely to affect the performance of IC. Refer to FIG. 1 for the data proposed by B. H. Calhoun, which shows the latency distributions of IC operating at different voltages. It is found in FIG. 1: the operation of IC is considerably decelerated at ultralow voltages (200 mV/300 mV). In comparison with the operation at a normal voltage (1V), the slowest speed at 200 mV is 1000 times slower than the slowest speed at 1V, and the slowest speed at 300 mV is still 100 times slower than the slowest speed at 1V. It is also found in FIG. 1: the lower the operating voltage, the wider the curve. The abovementioned phenomenon indicates that the latency distributions and variations spread divergently for ICs operating at different voltages. Refer to FIG. 2 and FIG. 3 respectively showing the normalized latencies of ICs operating at 300 mV and 1.2V. FIG. 2 and FIG. 3 shows that lowering the operating voltage not only decreases the overall speed of the circuit but also increases the range of speed variation. The latency of the slowest case is 1.4 times the relative latency. Thus, the overall performance of the circuit is degraded. The synchronous circuit technology normally adopts a single clock and uses STA (Static Timing Analysis) of EDA (Electronic Design Automation) to analyze latency of the circuit and designs the circuit according to the worst case: slow PMOS/slow NMOS operating at a voltage lower than the rated voltage by 10% and a temperature of 125° C. to guarantee that the circuit fabricated by any possible process and receiving inputs of different variations can operate correctly at any possible voltage and temperature. Directly using the traditional overproof design rule to design ultralow-voltage IC is too pessimistic an approach, which will seriously downgrade the performance. The non-synchronous IC technology suffers from lacking an EDA tool available to verify the IC design. The variable-latency datapath is a circuit technology effectively exempt from satisfying the worst case, not overproofing IC to deal with the worst case but designing IC according to the normal case. Refer to FIG. 4 a diagram schematically showing a variable-latency datapath. The block in the center denotes a variable-latency datapath. The input is triggered by the clock. The variable-latency datapath processes the input x[n] and outputs y[n]. The datapath contains an error detection circuit 10, which can be realized by various error detection methods. Different variable-latency datapath technologies are respectively characterized by the error detection methods thereof. While the latency is lengthy, the error detection circuit 10 emits a waiting signal to indicate that the datapath is still operating.

Figure 5:
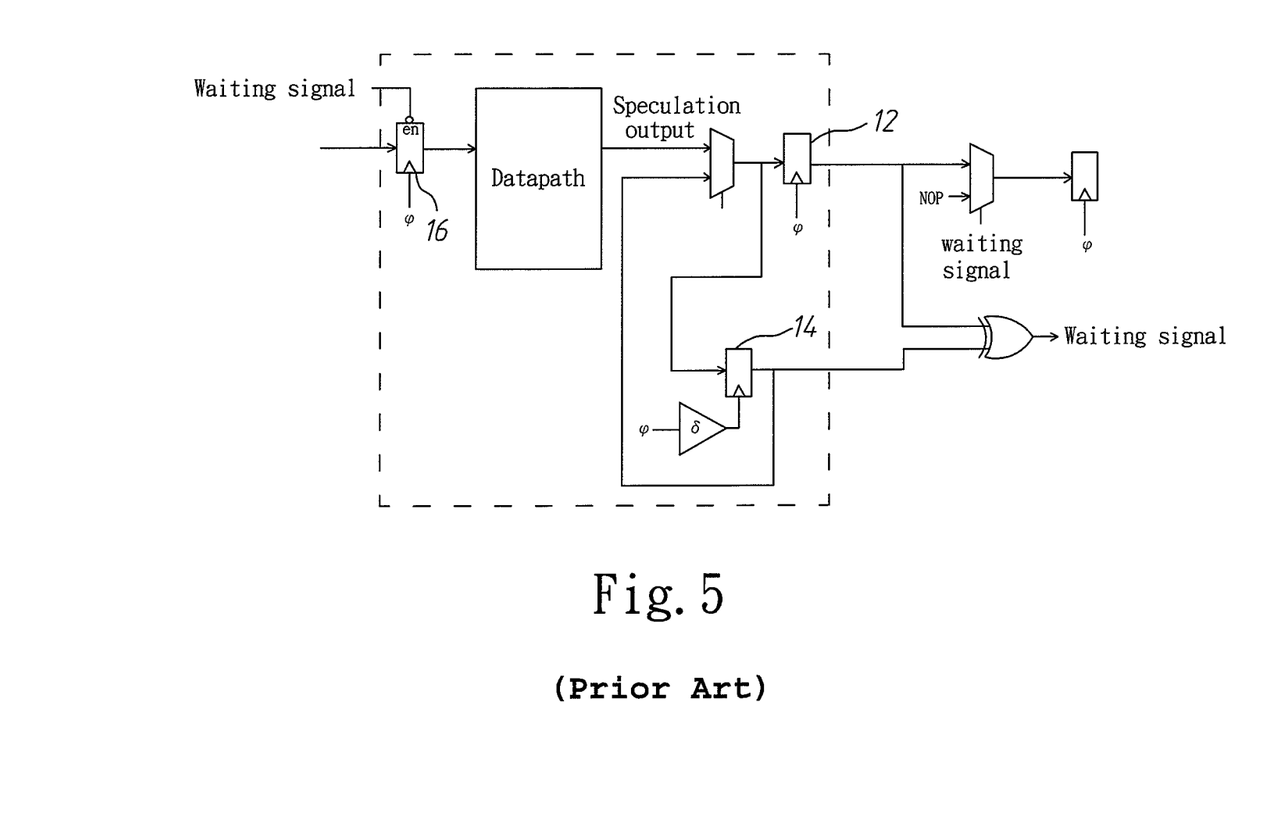
FIG. 5 is a diagram schematically showing the circuit of a double-latching mechanism in a conventional technology.

The double latching mechanism is one of the variable-latency datapath technologies. In addition to data variation, the double latching mechanism can also dynamically deal with the variations in fabrication process, voltage and temperature. Refer to FIG. 5 schematically showing a circuit-level double latching mechanism for latency speculation. The traditional synchronous circuit technology adjusts the execution clock rate to equal or exceed the path latency of the worst case of the computing core so as to guarantee that the calculation can be completed correctly and timely in all cases. The double latching mechanism would radically force the execution clock rate to be lower than that required by the path latency of the worst case so as to achieve a faster operation speed and support the latency speculation circuit. The double latching mechanism needs two latches respectively storing a speculation value and a correct value, a comparator comparing the speculation value with the correct value, and a clock-delay latch latching the correct value. The double latching mechanism will store the speculation result in a second latch 12 beforehand. The abovementioned action should be undertaken in a premise that most calculations can be completed within the current clock cycle. Otherwise, the double latching mechanism can only achieve very limited benefit or even achieves none benefit. After the extra clock delay, the double latching mechanism stores the correct result in a third latch 14. The sum of the clock delay and the original clock cycle should equal or exceed the path latency of the worst case so as to guarantee that the calculation can achieve a correct result. If the result stored in the second latch 12 is consistent with the result stored in the third latch 14, it indicates that the speculation is successful. Then, the calculation process continues. If the result stored in the second latch 12 is inconsistent with the result stored in the third latch 14, the calculation results based on the incorrect speculation result are all deleted. Then, the correct result stored in the third latch 14 is fed back to the second latch 12 in the next clock cycle and calculated once again. The system behavior of an incorrect speculation is equivalent to stalling the pipeline for a clock cycle or using two clock cycles to complete the calculation of the data.

Figure 6:
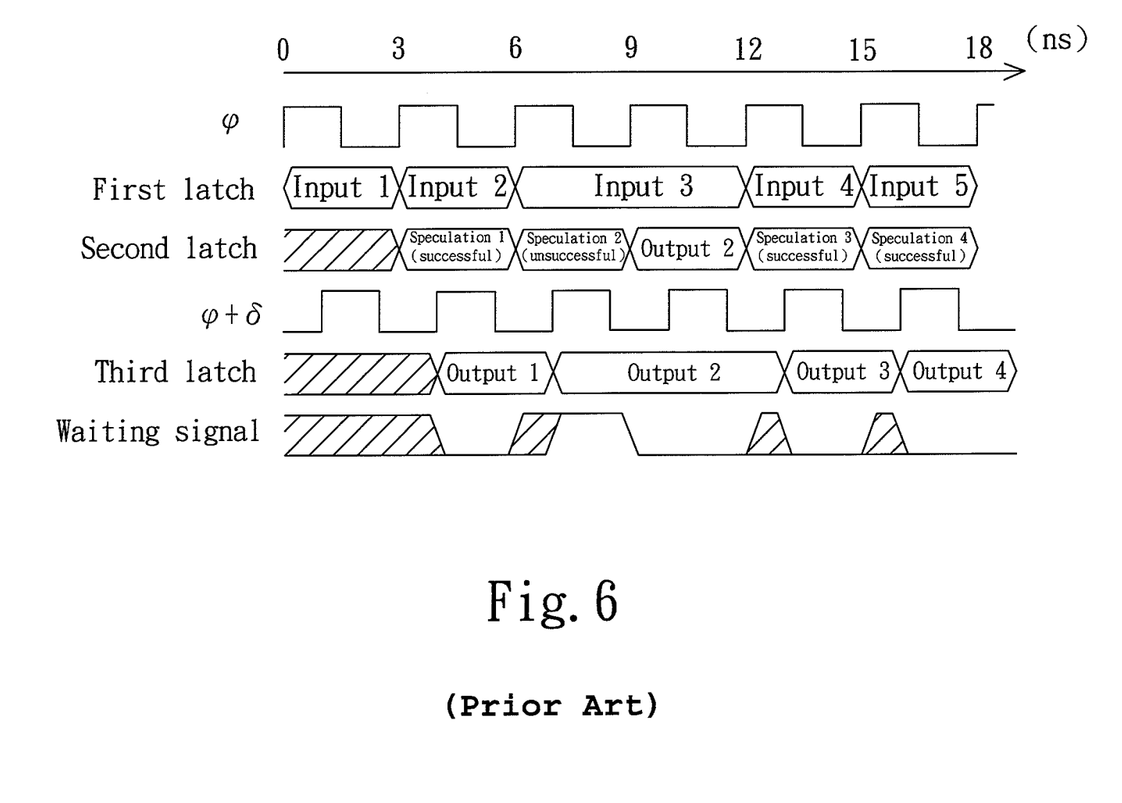
FIG. 6 is a timing diagram of a double-latching mechanism in a conventional technology.

Refer to FIG. 6 for a timing diagram describing an example of the double latching mechanism, wherein $\varphi$ is a clock cycle of 3 ns, $\delta$ is a clock delay of 1 ns. In the example, the delay of the worst case of the datapath is 4 ns ($\varphi+\delta$). The first piece of data enters the system at the $0^{th}$ ns. The second latch 12 latches the speculation output at the $3^{rd}$ ns. After the elapse of 1 ns, i.e. at the $4^{th}$ ns (the first clock cycle $\varphi$+the delay $\delta$), the third latch 14 latches the correct output. If the output at the $3^{rd}$ ns is consistent with the output at the $4^{th}$ ns, the speculation is successful. The speculation output of the input received at the $3^{rd}$ ns is latched at the $6^{th}$ ns. The correct output of the input received at the 3$^{rd}$ ns is latched at the 7$^{th}$ ns. As the output at the 6$^{th}$ ns is inconsistent with the output at the 7$^{th}$ ns, the pipeline is stalled during this clock cycle. The third latch 14 feeds back the correct value to the second latch 12. The second latch 12 latches the correct value and outputs the correct value at the 9$^{th}$ ns. As the pipeline is stalled during this period of time and calculation is undertaken once again, the first latch 16 does not receive any new input until the 12$^{th}$ ns. At the 12$^{th}$ ns, the second latch 12 latches the speculation output of the datapath. At the 13$^{th}$ ns, the third latch 14 latches the correct output. As the speculation is successful, the second latch 12 directly latches the speculation output at the 15$^{th}$ ns, and the third latch 14 latches the correct output. As the value of the second latch 12 is consistent with the value of the third latch 14, the speculation is successful.

In order to prevent the correct data, which is latched in the third latch 14 during the datapath delay, from the race condition, the computing core has to guarantee that the shortest datapath delay is not smaller than δ lest the data stored in the first latch 16 for the succeeding calculation interfere with the current calculation. In practice, the circuit level and latency speculation of the double latching mechanism can be incorporated into the IC design process, wherein the double latching mechanism is triggered by the reverse clock pulse; the duty cycle is controlled to adjust δ; the shortest datapath delay is realized via constraining the hold time, whereby extra transistors can be interposed to satisfy the limitation. The abovementioned double latching mechanism has a drawback complained often: it detects timing violation at a considerable cost. Especially in the processor design, the extra third latch 14 functioning as the shadow register, the extra transistors for avoiding the race condition, and the comparator for verifying the speculation value have a total size almost identical to the size of the arithmetic unit whose outputs are speculated, occupying extra area of the chip and consuming extra power. Further, the delay required by the shadow register brings about difficulties in designing the clock tree. Furthermore, the duty cycle ratio is hard to maintain constant in various modes and at different operating voltages even though dual edge triggering is adopted. The clock tree is very likely to be influenced by variances. Therefore, the system is hard to generate accurate clock latency. Then, the uncertainty of clock signals increases, and more overproof designs are required to overcome the extra problems. Thus, the gain cannot balance the loss.

Accordingly, the present invention proposes a speculative lookahead processing device and method to overcome the abovementioned problems.

SUMMARY OF THE INVENTION

The primary objective of the present invention is to provide a speculative lookahead processing device and method, which uses at least two datapath units to undertake synchronous calculations of an input signal and generate a correct value and a speculation value, and compares the two values to shorten the delay of computation and decrease the difficulties in clock latency design, and which does not interpose extra transistors but uses the synchronous calculation technology to constrain the hold time, whereby to promote the performance and power efficiency of the system.

To achieve the abovementioned objective, the present invention proposes a speculative lookahead processing device, which comprises at least two datapath units processing an input signal alternately and undertaking the calculations of the input signal. Each datapath unit outputs a correct value at the Nth cycle after the beginning of calculation and generates a speculation value to forward the succeeding calculation at the Mth cycle after the beginning of calculation, wherein M and N are natural numbers and M is smaller than N. Each datapath unit is connected with at least one first multiplexer and a second multiplexer, which are controlled by a timing controller to output data. The second multiplexer outputs the correct value of the datapath units in a round-robin way. The first multiplexers output the speculation values of the datapath units in a round-robin way. In the common pipelined design, an error detection circuit is additionally added to the device. In one embodiment, the error detection circuit is implemented via storing the speculation value in a register at the first Mth cycle; outputting the correct value at the Nth cycle, comparing the correct value with the speculation value, using the comparison result as a waiting signal; if the two values are identical, letting the waiting signal be 0; if the two values are not identical, letting the waiting signal be 1; the waiting signal determining whether to stall the input signal (or the entire pipeline); inputting the input signal to the datapath units if the waiting signal is 0.

The present invention also proposes a speculative lookahead processing method, which comprises steps: at least two datapath units processing and calculating an input signal in a round-robin way; sequentially outputting the calculation value at the Nth cycle after the beginning of calculation; generating the speculation value to forward the succeeding calculation at the first Mth cycle, wherein M and N are natural numbers and M is smaller than N. In the design requiring shorter latency, an error detection circuit is additionally added to the device to generate a waiting signal. If the waiting signal is 0, continue to execute the instruction corresponding to the speculation value. If the waiting signal is 1, stall the pipeline or stop inputting signals to the device for a period of time until the datapaths complete the calculation.

Below, embodiments are described in detail in cooperation with drawings to make easily understood the technical contents, characteristics and accomplishments of the present invention.

DETAILED DESCRIPTION OF THE INVENTION

The present invention originates from the following facts: many cases must be considered in determining the clock cycle; most of the cases are away from the worst case by considerable distance, especially in the low-voltage environment; while few worst cases appear, one or more cycles are spent to complete calculation lest all the calculations be decelerated by few worst cases. The device of the present invention is similar to the non-synchronous circuit in operation but similar to the synchronous circuit in verifying the design. The device of the present invention can be designed with the standard EDA tool and the standard cell-based design flow. The present invention can promote the overall performance of the circuit.

Figure 7:
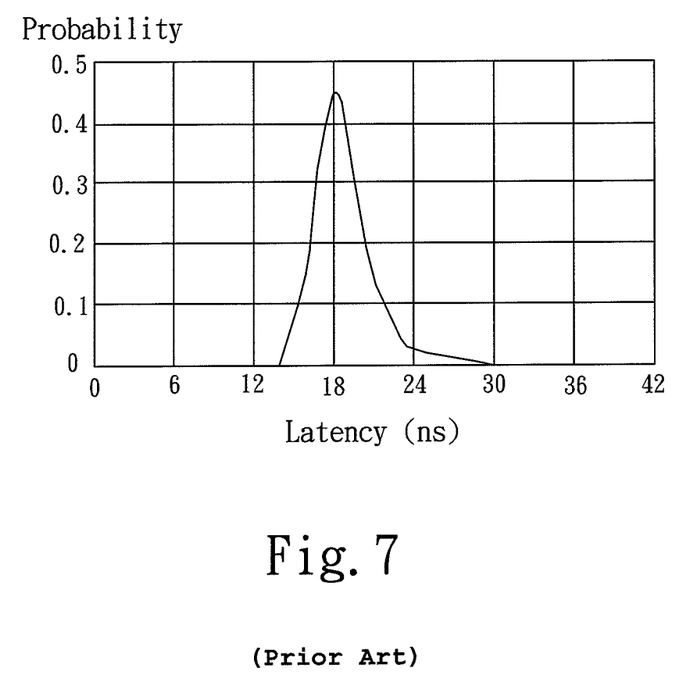
FIG. 7 shows the latency distributions of a 17×17-bit multiplier in a conventional technology.

The variable-latency datapath of the present invention effectively compresses the clock cycle of the circuit to be within the critical path delay of the worst case and thus promotes the overall performance of the circuit. Refer to FIG. 7 for latency distributions of a 17×17-bit multiplier in a conventional technology. In FIG. 7, the critical path delay is 42 ns, which is almost unlikely to occur in practice. Therefore, the clock cycle is set to be 25 ns, and two clock cycles (50 ns) are spent in undertaking few multiplication calculations needing a calculation time of over 25 ns. If the proportion of the abovementioned few multiplication calculations consuming 2 clock cycles is 5%, the average time of completing a multiplication calculation is only 26.25 ns. Thus, the performance is 1.6 times enhanced. If STA (Static Timing Analysis) is used to analyze latency, overproof design is required to deal with dynamic variations of the fabrication process, voltage and temperature. Thus, the present invention is proved to have higher efficiency than the conventional design.

Figure 8:
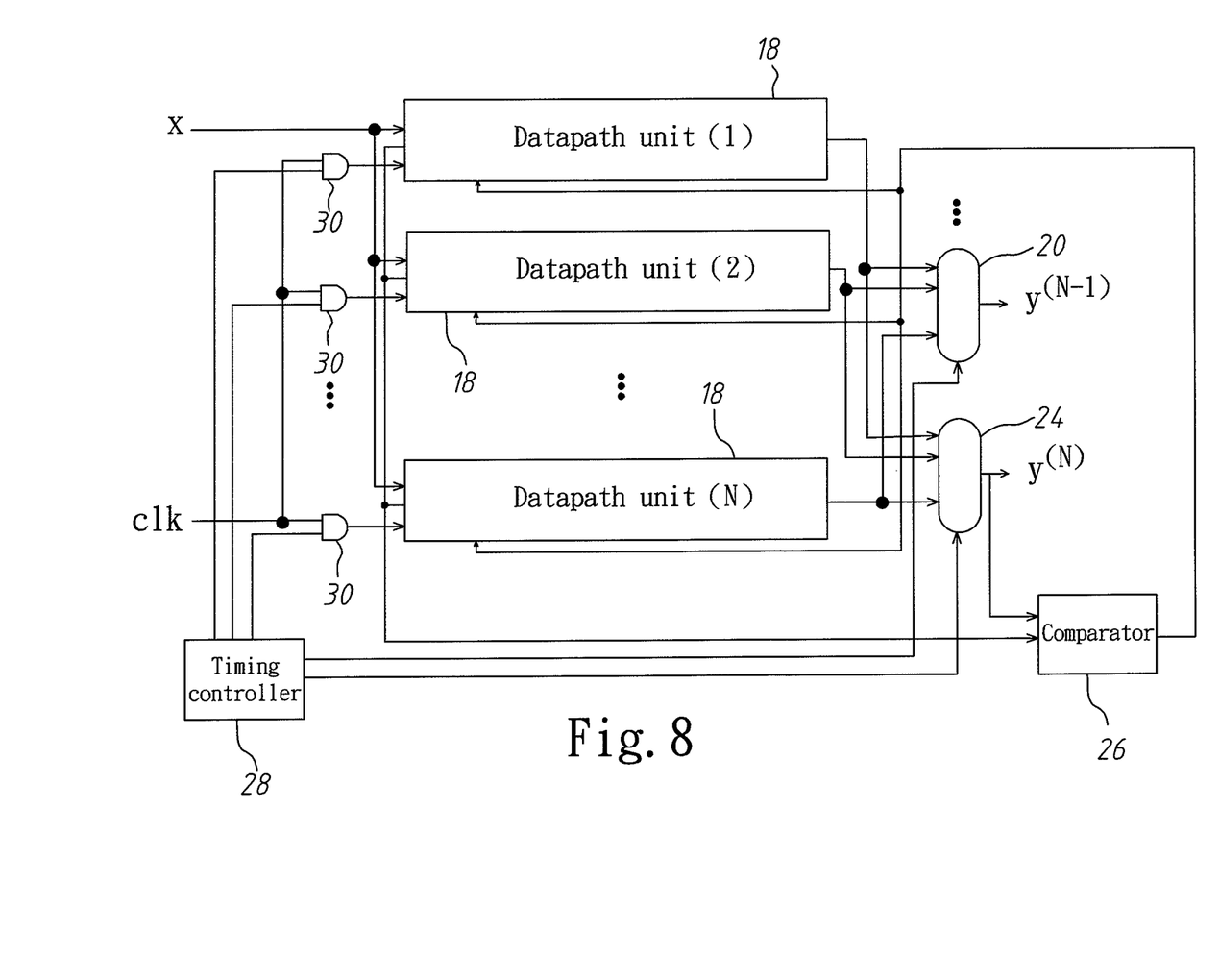
FIG. 8 is a diagram schematically showing the circuit of a speculative lookahead processing device according to one embodiment of the present invention.

Refer to FIG. 8 a diagram schematically showing the circuit of a speculative lookahead processing device according to one embodiment of the present invention. The device of the present invention comprises N pieces of datapath units 18. Each datapath unit 18 receives and calculates an input signal x to generate a correct value and a speculation value. N is a natural number greater than or equal to 2. The output terminal of each datapath unit 18 is connected with at least one first multiplexer 20 and a second multiplexer 24. In the embodiment shown in FIG. 8, the device of the present invention has a plurality of datapath units 18, a plurality of speculation values and a plurality of first multiplexers 20. Let N be a natural number greater than or equal to 3. The device of the present invention has (N−1) pieces of first multiplexers 20 and generates (N−1) pieces of speculation values. According to the input signal x, the datapath unit 18 generates a correct value $y^N$ and transmits $y^N$ to the second multiplexer 24. The second multiplexer 24 outputs the correct value at the Nth cycle of the datapath unit 18. The speculation values are symbolized by $y^{(N-1)}, y^{(N-2)}, \ldots, y^{(1)}$, which respectively represent the speculation values output by the datapath units 18 at the ends of the (N−1)th cycle, the (N−2)th cycle, ..., the first cycle. The first multiplexer 20 receives the abovementioned speculation values $y^{(N-1)}, y^{(N-2)}, \ldots, y^{(1)}$, and sequentially outputs the abovementioned speculation values $y^{(1)}, \ldots, y^{(N-2)}, y^{(N-1)}$ during the first M cycles, wherein M is a natural number smaller than N.

A timing controller 28 is connected with the second multiplexer 24 and the first multiplexers 20 and controls the timing when the second multiplexer 24 outputs the correction value $y^N$ and the timing when the first multiplexers 20 output $y^{(1)}, \ldots, y^{(N-2)}, y^{(N-1)}$. Each datapath unit 18 is connected with a demultiplexer 30. The demultiplexer 30 is connected with the timing controller 28 and receives a clock signal clk from the timing controller 28. The timing controller 28 uses the clock signal clk and cooperates with all the demultiplexers 30 to control all the datapath units 18 to receive the input signal x 18 in a round-robin way. In other words, the datapath units 18 receive the input signal x in sequence from top to bottom. A comparator 26 is connected with the second multiplexer 24 and the datapath units 18, receiving the stored speculation values $y^{(1)}, \ldots, y^{(N-2)}, y^{(N-1)}$ and the correct value $y^N$ and comparing the correct value with each speculation value. While the speculation value is identical to the correct value, the comparator 26 drives the datapath unit 18 to continue to execute the instruction corresponding to the speculation value. While the speculation value is different from the correct value, the comparator 26 drives the datapath unit 10 to stall the pipeline for a period of time, such as a period of one cycle, to allow the second multiplexer 24 to output the correct value.

Below is described the process of a speculative lookahead processing method of the present invention. Firstly, the timing controller 28 uses the clock signal clk and cooperates with all the demultiplexers 30 to control all the datapath units 18 to receive the input signal x 18 in the round-robin way; the datapath units 18 calculates the input signal x, generating (N−1) pieces of speculation values and storing these speculation values, wherein N is a natural number equal to or greater than 2. Next, the datapath units 18 output the abovementioned speculation values $y^{(1)}, \ldots, y^{(N-2)}, y^{(N-1)}$ in sequence before executing the Nth cycle; the timing controller 28 controls the first multiplexers 20 to receive the speculation values $y^{(1)}, \ldots, y^{(N-2)}, y^{(N-1)}$ in sequence and output the abovementioned speculation values $y^{(1)}, \ldots, y^{(N-2)}, y^{(N-1)}$ in sequence during the first M cycles. While the datapath unit 18 is executing the Nth cycle, the timer controller 28 controls the second multiplexer 24 to output the correct value $y^N$ generated by the datapath unit 18 according to the input signal x. Then, the comparator 26 receives the correct value $y^N$ and the speculation values $y^{(1)}, \ldots, y^{(N-2)}, y^{(N-1)}$ and compares the correct value with each speculation value; if the speculation value is identical to the correct value, the comparator 26 drives the datapath unit 18 to continue to execute the instruction corresponding to the speculation value; if the speculation value is different from the correct value, the comparator 26 drives the datapath unit 18 to stall the pipeline for a period of time, such as a period of one cycle, to allow the second multiplexer 24 to output the correct value.

The present invention is characterized in synchronously calculating the speculation values and the correct value; using multiplexers to undertake selection; and promoting the performance and efficiency of the system via constraining the hold time without using extra transistors.

Figure 9A:
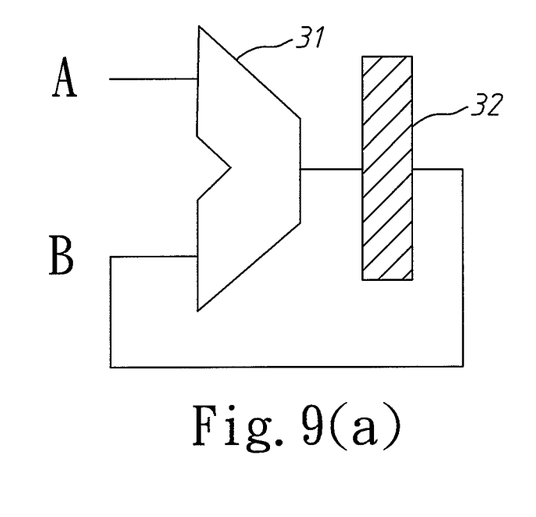
FIG. 9(a) and FIG. 9(b) schematically respectively show the circuit and timing diagrams of an accumulator according to one embodiment of the present invention.
Figure 9B:
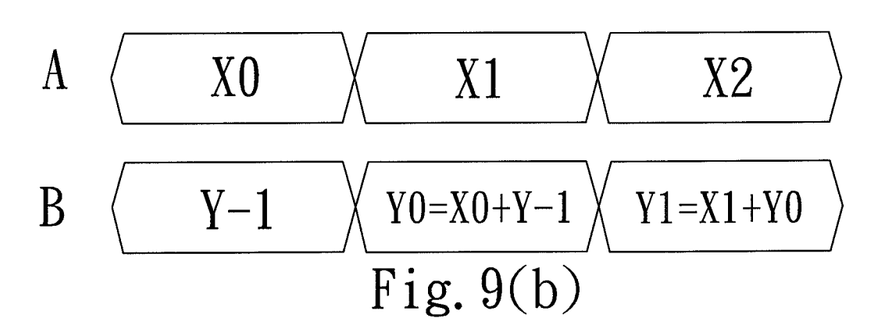

Refer to FIG. 9(a) and FIG. 9(b) respectively showing the circuit and timing diagram of an accumulator according to one embodiment of the present invention, wherein an adder 31 inside the accumulator takes a cycle to undertake addition, and a register 32 receives the output of the adder 31. An external input enters the adder 31 via an input terminal A, and the output of the register 32 enters the adder 31 via an input terminal B at the same time. As shown in FIG. 9(a) and FIG. 9(b), the input terminal A respectively receives external inputs X0, X1 and X2 during different cycles, and the register 32 outputs (Y−1) during the first cycle. Thus, the adder 31 adds X0 to (Y−1) and gets Y0. Y0 is stored in the register 32. In the second cycle, the input terminal A receives the external input X1, and the input terminal B receives the output of the register 32, i.e. the calculation result of the preceding cycle Y0. The adder 31 adds X1 to Y0 to get Y1 and stores Y1 to the register 32. In the succeeding cycle, the adder 31 will add X2 to Y1 to get a new value.

Figure 10A:
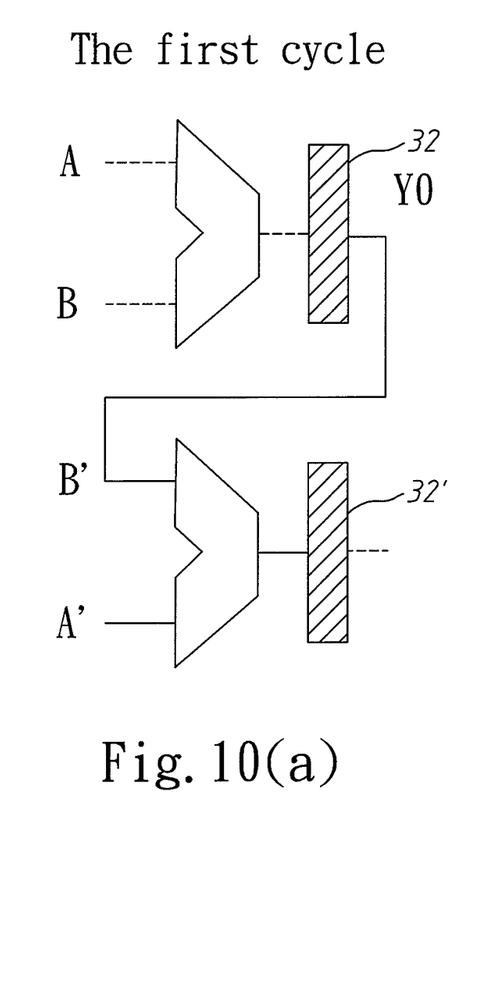
FIG. 10(a) is a diagram schematically showing the application of a speculative lookahead processing device to an accumulator at the first cycle according to one embodiment of the present invention.
Figure 10B:
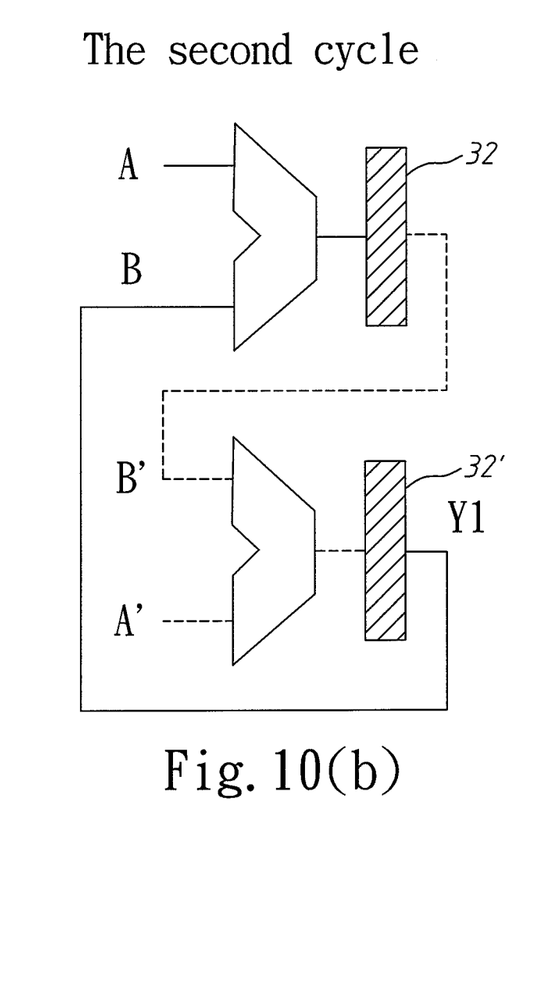
FIG. 10(b) is a diagram schematically showing the application of a speculative lookahead processing device to an accumulator at the second cycle according to one embodiment of the present invention.

Refer to FIG. 10(a) and FIG. 10(b) respectively diagrams schematically showing the applications of a speculative lookahead processing device to the first cycle and the second cycle of an accumulator according to one embodiment of the present invention. The timing diagrams corresponding to FIG. 10(a) and FIG. 10(b) are shown in FIGS. 11-14. In each of FIG. 10(a) and FIG. 10(b), there are two datapaths, which are accumulators. The datapath outputs the correct value at the second cycle and outputs the speculation value at the first cycle. Both the correct value and the speculation value are received by the registers. The external input is transmitted to the input terminal A and the input terminal A' in a round-robin way. The datapaths also undertake calculations in a round-robin way corresponding to the round-robin inputs. The input of the input terminal B is the output of the lower register 32'—the sum of A' and B', which is the result of addition undertaken in the preceding cycle. The input of the input terminal B' is the output of the upper register 32—the sum of A and B, which is the result of addition undertaken in the preceding cycle. The timing diagrams of the above-mentioned operations are described below.

Figure 11:
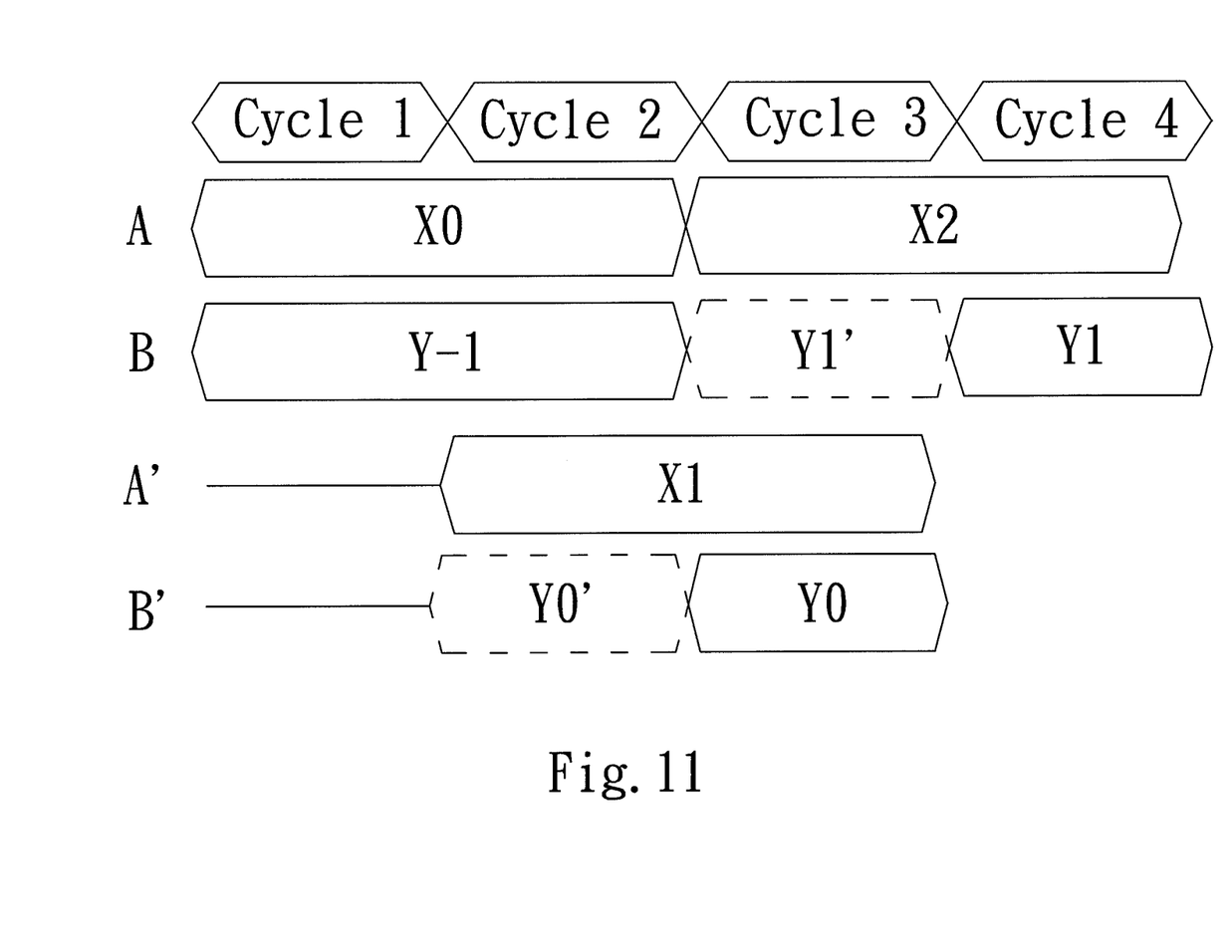
FIG. 11 is a timing diagram of a case wherein all speculations are successful while a speculative lookahead processing device of the present invention is applied to an accumulator.

Refer to FIG. 11 a timing diagram of a case wherein all speculations are successful while the speculative lookahead processing device of the present invention is applied to an accumulator. The accumulator receives external inputs X0, X1 and X2 in sequence at different cycles. The input X0 is executed by the upper datapath. The input X1 is executed by the lower datapath alternatively. Then, the input X2 is executed by the upper datapath again. In the first cycle, the upper datapath calculates the addition of X0 and Y−1. As only a cycle is spent in the calculation, the result is speculative. Y0' is used to symbolize the speculation value. The speculation value Y0 is stored in the upper register 32. In the second cycle, the upper datapath mainly undertakes two things: the first thing is continuing to calculate to obtain the correct value; the second thing is undertaking comparison to examine whether the correct value is identical to the speculation value. The correct value is transmitted to and stored in the upper register 32. In the case shown in FIG. 11, the speculation is successful, i.e. the speculation value is identical to the correct value. Therefore, both the inputs of the input terminal A' and the input terminal B' of the lower datapath are correct, and the lower datapath is not influenced. In the third cycle, the upper datapath receives the input X2 and the speculation value of the lower datapath. The operation of the third cycle is the same as the operation of the preceding cycle: the lower datapath speculates successfully, and the upper datapath works normally.

Figure 12:
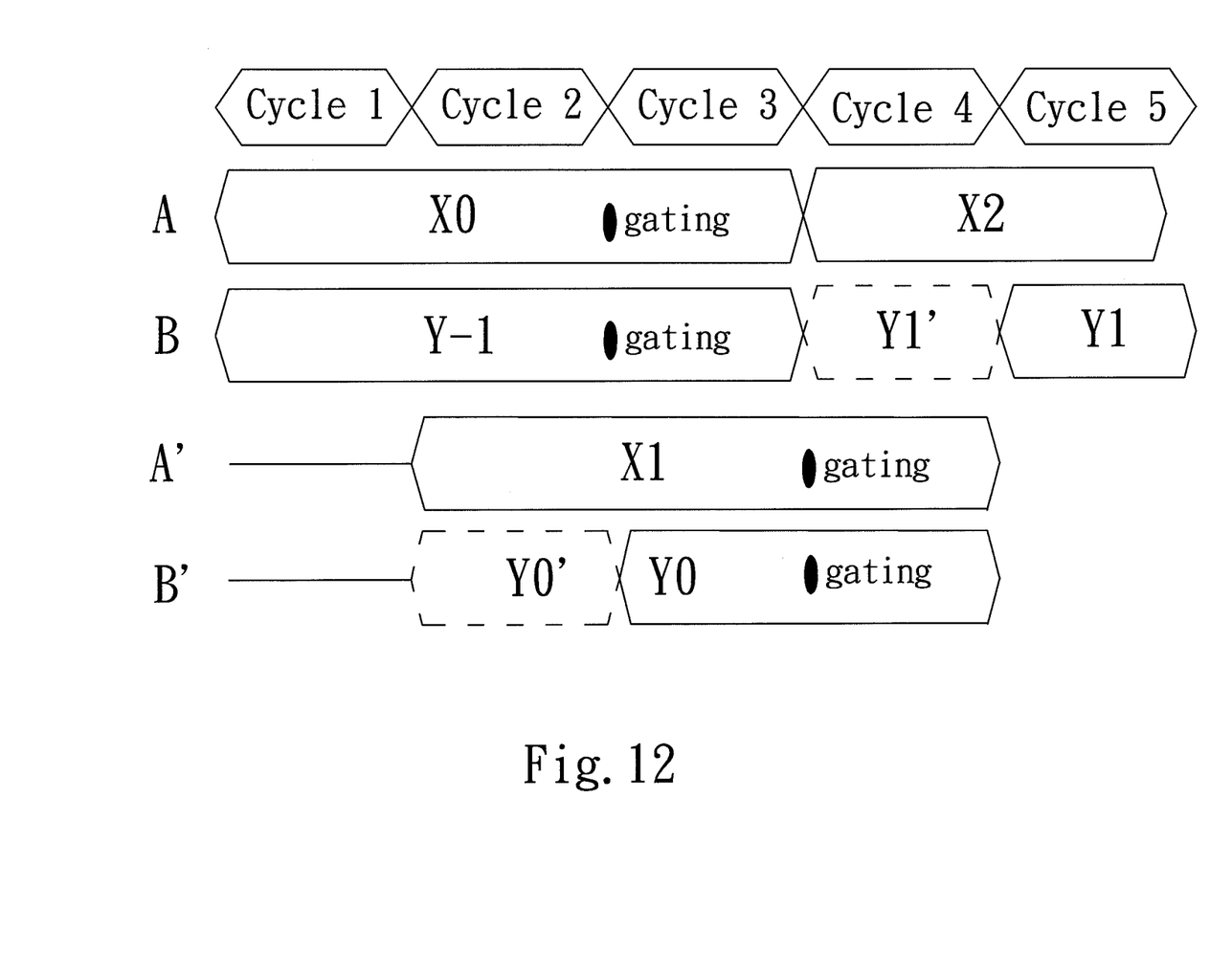
FIG. 12 is a timing diagram of a case wherein only the speculation of the first input fails while the speculative lookahead processing device of the present invention is applied to an accumulator.

Refer to FIG. 12 a timing diagram of a case wherein only the speculation of the first input fails while the speculative lookahead processing device of the present invention is applied to an accumulator. The failure of speculation occurs in the second cycle, i.e. the speculation value is not identical to the correct value. Thus, the system stalls the pipeline and interrupts inputting for a cycle. Then, the third input X2 does not enter the datapath until the fourth cycle. During the stall of the pipeline, the timing controller sends a gating signal to the input terminals of the upper datapath to keep the input values for an additional cycle and guarantee that the inputs to the lower datapath can be maintained for two full cycles. In this case, the datapath spends two cycles in calculation. In the second cycle, the lower datapath receives and calculates the incorrect speculation value Y0' and outputs an incorrect value. Therefore, the system transmits the correct value Y0 to the datapath and resumes calculation in the third cycle. In order to deal with the resumed calculation and enable the datapath to calculate for two full cycles, the system sends a gating signal to the input terminals A' and B' in the fourth cycle, keeping the input for a cycle until the input X2 enters the datapath.

Figure 13:
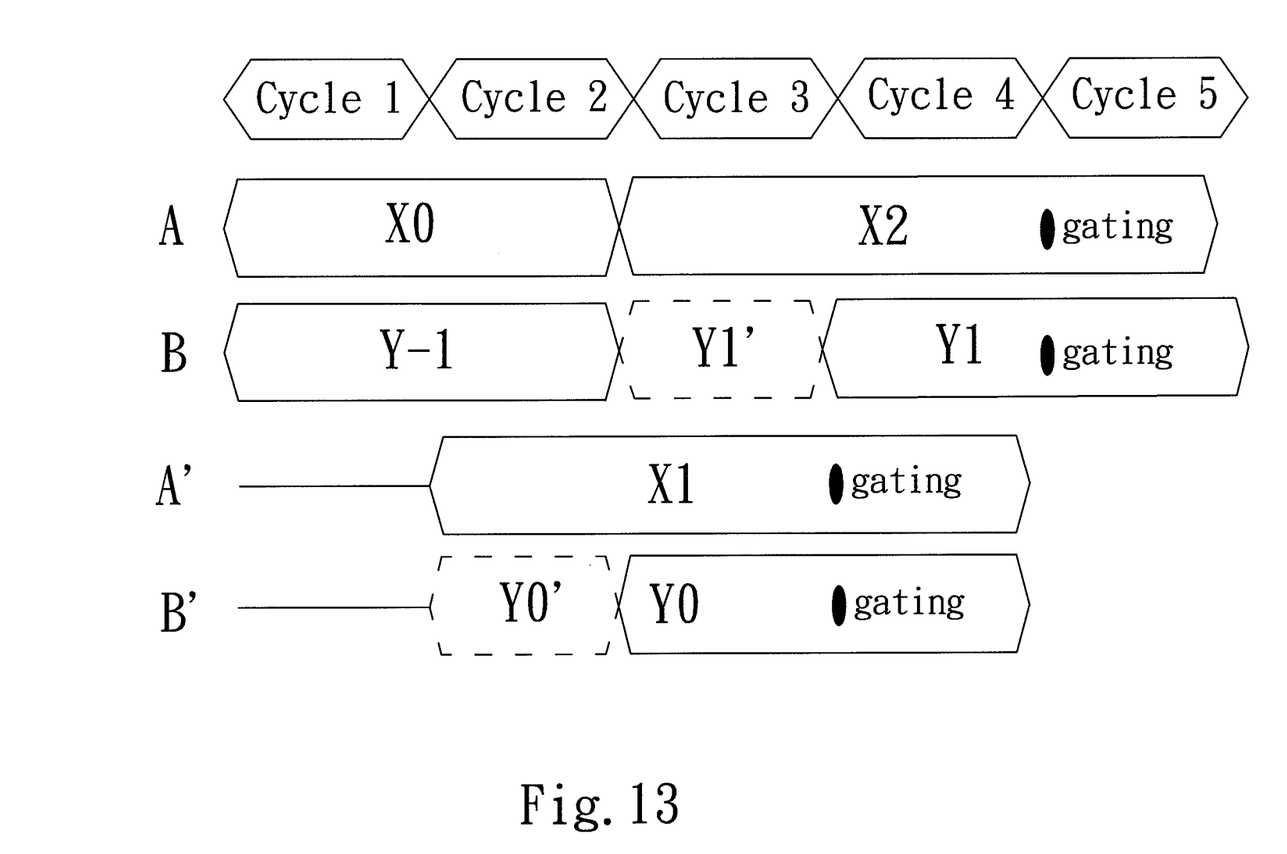
FIG. 13 is a timing diagram of a case wherein only the speculation of the second input fails while the speculative lookahead processing device of the present invention is applied to an accumulator.

Refer to FIG. 13 a timing diagram of a case wherein only the speculation of the second input fails while the speculative lookahead processing device of the present invention is applied to an accumulator. In this case, a speculation fails in the fourth cycle. Thus, the system interrupts inputting for a cycle and sends a gating signal to the lower datapath for keeping the input for a cycle. In the next cycle, the system sends a gating signal to the upper datapath for keeping the input for one more cycle.

Figure 14:
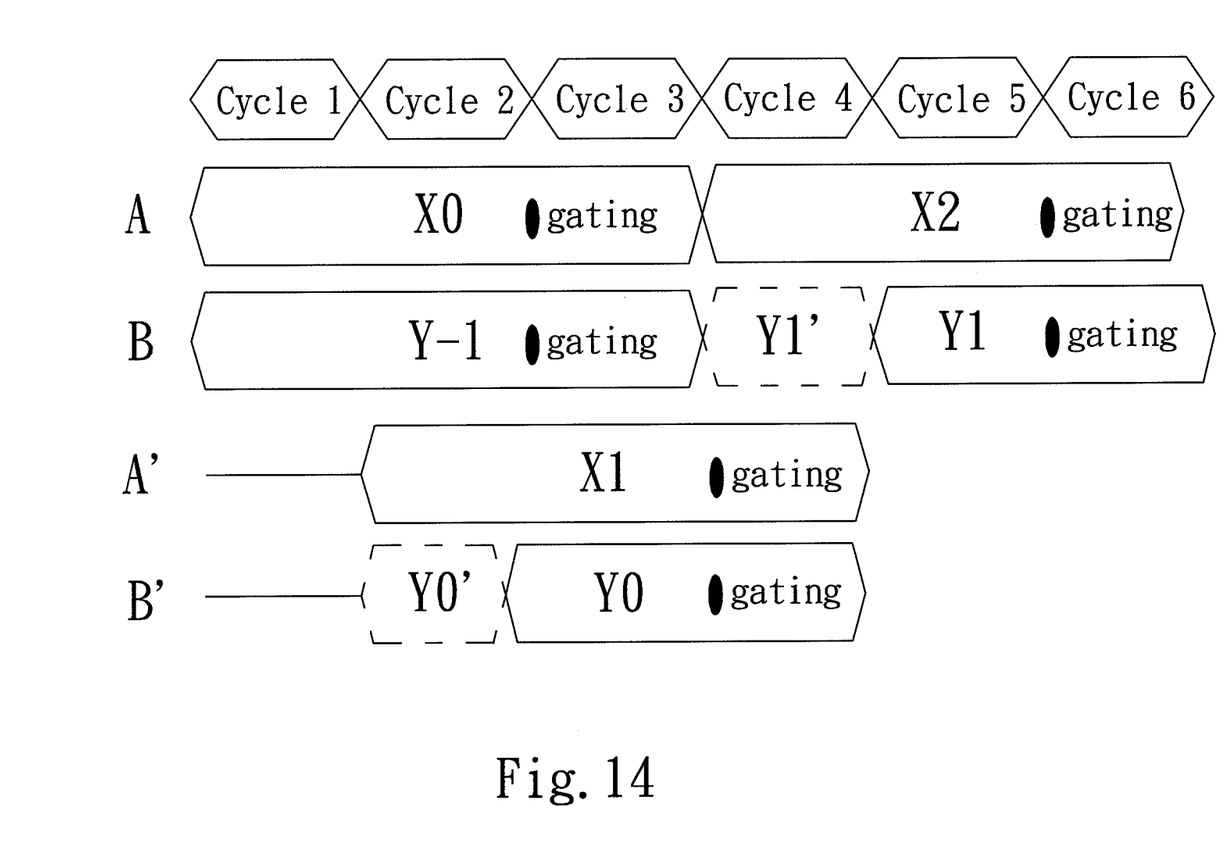
FIG. 14 is a timing diagram of a case wherein the speculations of the front two inputs fail while the speculative lookahead processing device of the present invention is applied to an accumulator.

Refer to FIG. 14 a timing diagram of a case wherein the speculations of the front two inputs fail while the speculative lookahead processing device of the present invention is applied to an accumulator. The front three cycles in FIG. 14 are the same as FIG. 12. However, a speculation fails in the fourth cycle in FIG. 14. Thus, the system interrupts inputting for a cycle and sends a gating signal to the lower datapath for keeping the input for a cycle. In the next cycle, the system sends a gating signal to the upper datapath for keeping the input for one more cycle.

In conclusion, the present invention proposes a speculative lookahead processing device and method characterized in synchronously calculating the speculation value and the correct value, and using multiplexers to determine whether to output the speculation value or the correct value, whereby the latency is effectively shortened and the system performance is obviously enhanced.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A speculative lookahead processing device comprising
at least two datapath units receiving and calculating one input signal, so as to generate and store one speculation value during a first clock cycle of a circuit, and said datapath units use said input signal to generate a correct value during a second clock cycle of the circuit after said speculation value is generated and stored during said first clock cycle;
one first multiplexer connected with an output terminal of each of said datapath units, the first multiplexer receiving and outputting said speculation value during the first clock cycle;
a second multiplexer connected with an output terminal of each of said datapath units, the second multiplexer outputting said correct value during the second clock cycle; and
a comparator connected with said datapath units and said second multiplexer, the comparator receiving said speculation value and said correct value from the datapath units and the second multiplexer and comparing said speculation value with said correct value during the second clock cycle, and driving said datapath units based on a comparison result during the second clock cycle,
wherein the comparator drives the datapath units to execute an instruction corresponding to said speculation value if the comparator determines that said speculation value is identical to said correct value.

2. The speculative lookahead processing device according to claim 1, wherein while said speculation value is different from said correct value, said comparator drives said datapath units to stall a pipeline for a period of time allowing said second multiplexer to output said correct value.

3. The speculative lookahead processing device according to claim 2, wherein said period of time is equal to a cycle.

4. The speculative lookahead processing device according to claim 1 further comprising a timing controller, which is connected with said first multiplexer and said second multiplexer and controls timing of outputting said speculation value and said correct value.

* * * * *